(12) United States Patent
Nachimuthu et al.

(10) Patent No.: US 9,612,649 B2
(45) Date of Patent: Apr. 4, 2017

(54) METHOD AND APPARATUS TO SHUTDOWN A MEMORY CHANNEL

(75) Inventors: Murugasamy K. Nachimuthu, Beaverton, OR (US); Mohan J. Kumar, Aloha, OR (US)

(73) Assignee: Intel Corporation, Santa Clara, CA (US)

(*) Notice: Subject to any disclaimer, the term of this patent is extended or adjusted under 35 U.S.C. 154(b) by 141 days.

(21) Appl. No.: 13/997,999

(22) PCT Filed: Dec. 22, 2011

(86) PCT No.: PCT/US2011/067007
§ 371 (c)(1),
(2), (4) Date: Feb. 3, 2014

(87) PCT Pub. No.: WO2013/095559
PCT Pub. Date: Jun. 27, 2013

(65) Prior Publication Data
US 2014/0143577 A1    May 22, 2014

(51) Int. Cl.
*G06F 1/26* (2006.01)
*G06F 1/32* (2006.01)
*G06F 12/08* (2016.01)
*G06F 12/0804* (2016.01)
*G06F 12/0802* (2016.01)
*G06F 12/1027* (2016.01)

(52) U.S. Cl.
CPC ............ *G06F 1/3275* (2013.01); *G06F 12/08* (2013.01); *G06F 12/0802* (2013.01); *G06F 12/0804* (2013.01); *G06F 12/1027* (2013.01); *G06F 2212/1028* (2013.01); *G06F 2212/205* (2013.01); *G06F 2212/2024* (2013.01); *Y02B 60/1225* (2013.01); *Y02B 60/1228* (2013.01)

(58) Field of Classification Search
CPC ... G06F 1/3203; G06F 1/3275; G06F 12/0804
USPC ...................................... 711/104, 165; 718/1
See application file for complete search history.

(56) References Cited

U.S. PATENT DOCUMENTS

| | | | |
|---|---|---|---|
| 5,912,839 | A | 6/1999 | Ovshinsky et al. |
| 6,917,999 | B2 | 7/2005 | Kumar et al. |
| 7,000,102 | B2 | 2/2006 | Kumar et al. |
| 7,117,311 | B1 | 10/2006 | Rankin et al. |
| 7,246,224 | B2 | 7/2007 | Rothman et al. |

(Continued)

FOREIGN PATENT DOCUMENTS

| | | |
|---|---|---|
| TW | 564991 | 12/2003 |
| TW | 200410255 A | 6/2004 |
| TW | M286985 | 2/2006 |

OTHER PUBLICATIONS

PCT International Search Report for PCT Counterpart Application No. PCT/US2011/067007, 3 pgs., (Sep. 26, 2012).

(Continued)

*Primary Examiner* — Aurel Prifti
(74) *Attorney, Agent, or Firm* — Blakely, Sokoloff, Taylor & Zafman LLP (57) ABSTRACT

A method is described that includes deciding to enter a lower power state, and, shutting down a memory channel in a computer system in response where thereafter other memory channels in the computer system remain active so that computer remains operative while the memory channel is shutdown.

18 Claims, 7 Drawing Sheets

(56) References Cited

U.S. PATENT DOCUMENTS

| | | | |
|---|---|---|---|
| 7,337,368 B2 | 2/2008 | Wynn et al. | |
| 7,350,087 B2 | 3/2008 | Naveh et al. | |
| 7,376,037 B1 | 5/2008 | Law et al. | |
| 7,376,775 B2 | 5/2008 | Looi et al. | |
| 7,493,438 B2 | 2/2009 | Kaushik et al. | |
| 7,590,918 B2 | 9/2009 | Parkinson | |
| 7,600,078 B1 | 10/2009 | Cen et al. | |
| 7,673,090 B2 | 3/2010 | Kaushik et al. | |
| 7,756,053 B2 | 7/2010 | Thomas et al. | |
| 7,913,147 B2 | 3/2011 | Swaminathan et al. | |
| 8,051,253 B2 | 11/2011 | Okin et al. | |
| 8,145,732 B2 | 3/2012 | Kumar et al. | |
| 8,407,516 B2 | 3/2013 | Swanson et al. | |
| 8,462,537 B2 | 6/2013 | Karpov et al. | |
| 8,462,577 B2 | 6/2013 | Zeng et al. | |
| 8,463,948 B1 | 6/2013 | Qawami et al. | |
| 8,578,138 B2 | 11/2013 | Natu et al. | |
| 8,605,531 B2 | 12/2013 | Kau et al. | |
| 8,607,089 B2 | 12/2013 | Qawami et al. | |
| 8,612,676 B2 | 12/2013 | Dahlen et al. | |
| 8,612,809 B2 | 12/2013 | Casper et al. | |
| 8,649,212 B2 | 2/2014 | Kau et al. | |
| 8,671,309 B2 | 3/2014 | Raj et al. | |
| 8,838,935 B2 | 9/2014 | Hinton | |
| 9,298,606 B2 | 3/2016 | Ramanujan | |
| 9,317,429 B2 | 4/2016 | Ramanujan et al. | |
| 9,342,453 B2 | 5/2016 | Nale et al. | |
| 9,378,133 B2 | 6/2016 | Nachimuthu et al. | |
| 9,430,372 B2 | 8/2016 | Nachimuthu et al. | |
| 2003/0159024 A1 | 8/2003 | Chen | |
| 2006/0026211 A1* | 2/2006 | Potteiger | G06F 3/061 |
| 2007/0005922 A1 | 1/2007 | Swaminathan et al. | |
| 2007/0011421 A1* | 1/2007 | Keller, Jr. | G06F 1/3225 |
| | | | 711/165 |
| 2008/0016269 A1 | 1/2008 | Chow et al. | |
| 2008/0034148 A1 | 2/2008 | Gower | |
| 2008/0235528 A1 | 9/2008 | Kim et al. | |
| 2008/0270811 A1 | 10/2008 | Chow et al. | |
| 2009/0037641 A1 | 2/2009 | Bresniker | |
| 2009/0222620 A1* | 9/2009 | Kanai | G06F 1/3225 |
| | | | 711/104 |
| 2009/0313416 A1 | 12/2009 | Nation | |
| 2010/0131827 A1 | 5/2010 | Sokolov | |
| 2010/0162020 A1 | 6/2010 | Maule et al. | |
| 2010/0291867 A1 | 11/2010 | Abdulla et al. | |
| 2010/0293317 A1 | 11/2010 | Confalonieri et al. | |
| 2010/0306446 A1 | 12/2010 | Villa et al. | |
| 2010/0306453 A1 | 12/2010 | Doller | |
| 2010/0318718 A1 | 12/2010 | Eilert et al. | |
| 2011/0153916 A1 | 6/2011 | Chinnaswamy et al. | |
| 2011/0161592 A1 | 6/2011 | Nachimuthu et al. | |
| 2011/0179311 A1* | 7/2011 | Nachimuthu | G06F 11/3676 |
| | | | 714/42 |
| 2011/0208900 A1 | 8/2011 | Schuette et al. | |
| 2011/0271070 A1* | 11/2011 | Worthington | G06F 12/1009 |
| | | | 711/165 |
| 2011/0291884 A1 | 12/2011 | Oh et al. | |
| 2011/0299317 A1* | 12/2011 | Shaeffer | G11C 13/0002 |
| | | | 365/106 |
| 2012/0011504 A1* | 1/2012 | Ahmad | G06F 12/08 |
| | | | 718/1 |
| 2012/0023349 A1* | 1/2012 | Machida | G06F 1/3275 |
| | | | 713/320 |
| 2012/0079232 A1* | 3/2012 | Hinton | G06F 12/0292 |
| | | | 711/207 |
| 2013/0091331 A1* | 4/2013 | Moraru | G06F 12/126 |
| | | | 711/143 |
| 2013/0121075 A1* | 5/2013 | Hutchison | G11C 11/5628 |
| | | | 365/185.11 |
| 2013/0268728 A1 | 10/2013 | Ramanujan et al. | |
| 2013/0275661 A1 | 10/2013 | Zimmer et al. | |
| 2013/0290597 A1* | 10/2013 | Faber | G06F 12/0238 |
| | | | 711/102 |
| 2013/0290759 A1* | 10/2013 | Kumar | G06F 1/3275 |
| | | | 713/323 |
| 2013/0304980 A1* | 11/2013 | Nachimuthu | G06F 9/4403 |
| | | | 711/103 |
| 2013/0332676 A1* | 12/2013 | Kotla | G06F 12/0848 |
| | | | 711/129 |
| 2014/0040550 A1* | 2/2014 | Nale | G06F 13/1694 |
| | | | 711/118 |
| 2014/0082262 A1* | 3/2014 | Nachimuthu | G06F 12/00 |
| | | | 711/103 |
| 2014/0129767 A1* | 5/2014 | Ramanujan | G06F 12/0897 |
| | | | 711/105 |
| 2014/0297938 A1* | 10/2014 | Puthiyedath | G06F 12/08 |
| | | | 711/105 |

OTHER PUBLICATIONS

PCT Written Opinion of the International Searching Authority for PCT Counterpart Application No. PCT/US2011/067007, 3 pgs., (Sep. 26, 2012).

PCT Notification Concerning Transmittal of International Preliminary Report on Patentability (Chapter I of the Patent Cooperation Treaty) for PCT Counterpart Application No. PCT/US2011/067007, 5 pgs., (Jul. 3, 2014).

Lee et al., "Architecting Phase Change Memory as a Scalable DRAM Alternative", ISCA '09, Jun. 20, 2009, 12 pgs., Austin, Texas, USA.

Condit et al., "Better I/O Through Byte-Addressable, Persistent Memory", SOSP '09, Oct. 11, 2009, pp. 133-146. Big Sky, Montana, USA.

Freitas et al., "Storage-class memory: The next storage system technology", IBM J. Res. & Dev., Jul./Sep. 2008, pp. 439-447, vol. 52, No. 4/5.

Akel et al., "Onyx: A Prototype Phase Change Memory Storage Array",www.flashmemorysummit.com/.../Proceeding_2011/08/11_S301_Akel.pdf, 5 pgs.

Mearian, "IBM announces computer memory breakthrough Phase-change memory offers 100 times the write performance of NAND flash", Jun. 30, 2011, 3 pgs.

Caulfield et al., "Moneta: A High-performance Storage Array Architecture for Next-generation, Non-volatile Memories", Micro 43: Proceedings of the 43rd Annual IEEE/ACM International Symposium on Microarchitecture, Atlanta, GA Dec. 2010 pp. 385-395.

"The Non-Volatile Systems Laboratory Coding for non-volatile memories", http://nvsl.ucsd.edu/ecc, printed Sep. 1, 2011. 2 pgs.

"The Non-Volatile Systems Laboratory Moneta and Onyx: Very Fast SS", http://nvsl.ucsd.edu/moneta/, 3 pgs., Sep. 1, 2011.

"The Non-Volatile Systems Laboratory NV-Heaps: Fast and Safe Persistent Objects", http://nvsl.ucsd.edu/nvuheaps/, 2 pgs., Sep. 1, 2011.

"Phase change memory-based 'moneta' system points to the future of computer storage", ScienceBlog, Jun. 2, 2011, 7 pgs.

Qureshi et al., "Scalable High Performance Main Memory System Using Phase-Change Memory Technology", ISCA '09, Jun. 20, 2009, 10 pgs., Austin, Texas, USA.

Kant, Dr. Krishna, "Exploiting NVRAM for Building Multi-Level Memory Systems", International Workshop on Operating System Technologies for Large Scale NVRAM, Oct. 21, 2008, Jeju, Korea, 19 pages.

Bailey et al., "Operating System Implications of Fast, Cheap, Non-Volatile Memory" 13th USENIX, HOTOS11 2011, May 9-11, 2011, 5 pgs.

Raoux et al., "Phase-change random access memory: A scalable technology", IBM J. Res. & Dev., Jul./Sep. 2008, pp. 465-479, vol. 52, No. 4/5.

Chen et al., "Rethinking Database Algorithms for Phase Change Memory", 5th Biennial Conference on Innovative Data Systems Research (CIDR '11), Jan. 9, 2011, 11 pgs., Asilomar, California, USA.

Jacob et al., "The Memory System You Can't Avoid It, You Can't Ignore It, You Can't Fake It", 2009, 77 pgs., Morgan & Claypool.

(56) References Cited

OTHER PUBLICATIONS

Mogul et al., "Operating System Support for NVM+DRAM Hybrid Main Memory", 12th Workshop on Hot Topics in Operating Systems (HatOS XII), May 18, 2009, 9 pgs.
Wu, et al., "eNVy: A Non-Volatile, Main Memory Storage System" 1994 ACM., ASPLOS VI. pp. 86-97.
Ohiman, et al. "PDRAM: A Hybrid PRAM and DRAM Main Memory System", Jul. 26, 2009, Department of Computer Science and Engineering, 6 pages.

* cited by examiner

METHOD AND APPARATUS TO SHUTDOWN A MEMORY CHANNEL

CROSS-REFERENCE TO RELATED APPLICATION

This patent application is a U.S. National Phase Application under 35 U.S.C. §371 of International Application No. PCT/US2011/067007, filed Dec. 22, 2011, entitled POWER CONSERVATION BY WAY OF MEMORY CHANNEL SHUTDOWN.

FIELD OF THE INVENTION

This invention relates generally to the field of computer systems. More particularly, the invention relates to an apparatus and method for implementing a multi-level memory hierarchy.

DESCRIPTION OF THE RELATED ART

A. Current Memory and Storage Configurations

One of the limiting factors for computer innovation today is memory and storage technology. In conventional computer systems, system memory (also known as main memory, primary memory, executable memory) is typically implemented by dynamic random access memory (DRAM). DRAM-based memory consumes power even when no memory reads or writes occur because it must constantly recharge internal capacitors. DRAM-based memory is volatile, which means data stored in DRAM memory is lost once the power is removed. Conventional computer systems also rely on multiple levels of caching to improve performance. A cache is a high speed memory positioned between the processor and system memory to service memory access requests faster than they could be serviced from system memory. Such caches are typically implemented with static random access memory (SRAM). Cache management protocols may be used to ensure that the most frequently accessed data and instructions are stored within one of the levels of cache, thereby reducing the number of memory access transactions and improving performance.

With respect to mass storage (also known as secondary storage or disk storage), conventional mass storage devices typically include magnetic media (e.g., hard disk drives), optical media (e.g., compact disc (CD) drive, digital versatile disc (DVD), etc.), holographic media, and/or mass-storage flash memory (e.g., solid state drives (SSDs), removable flash drives, etc.). Generally, these storage devices are considered Input/Output (I/O) devices because they are accessed by the processor through various I/O adapters that implement various I/O protocols. These I/O adapters and I/O protocols consume a significant amount of power and can have a significant impact on the die area and the form factor of the platform. Portable or mobile devices (e.g., laptops, netbooks, tablet computers, personal digital assistant (PDAs), portable media players, portable gaming devices, digital cameras, mobile phones, smartphones, feature phones, etc.) that have limited battery life when not connected to a permanent power supply may include removable mass storage devices (e.g., Embedded Multimedia Card (eMMC), Secure Digital (SD) card) that are typically coupled to the processor via low-power interconnects and I/O controllers in order to meet active and idle power budgets.

With respect to firmware memory (such as boot memory (also known as BIOS flash)), a conventional computer system typically uses flash memory devices to store persistent system information that is read often but seldom (or never) written to. For example, the initial instructions executed by a processor to initialize key system components during a boot process (Basic Input and Output System (BIOS) images) are typically stored in a flash memory device. Flash memory devices that are currently available in the market generally have limited speed (e.g., 50 MHz). This speed is further reduced by the overhead for read protocols (e.g., 2.5 MHz). In order to speed up the BIOS execution speed, conventional processors generally cache a portion of BIOS code during the Pre-Extensible Firmware Interface (PEI) phase of the boot process. The size of the processor cache places a restriction on the size of the BIOS code used in the PEI phase (also known as the "PEI BIOS code").

B. Phase-Change Memory (PCM) and Related Technologies

Phase-change memory (PCM), also sometimes referred to as phase change random access memory (PRAM or PCRAM), PCME, Ovonic Unified Memory, or Chalcogenide RAM (C-RAM), is a type of non-volatile computer memory which exploits the unique behavior of chalcogenide glass. As a result of heat produced by the passage of an electric current, chalcogenide glass can be switched between two states: crystalline and amorphous. Recent versions of PCM can achieve two additional distinct states.

PCM provides higher performance than flash because the memory element of PCM can be switched more quickly, writing (changing individual bits to either 1 or 0) can be done without the need to first erase an entire block of cells, and degradation from writes is slower (a PCM device may survive approximately 100 million write cycles; PCM degradation is due to thermal expansion during programming, metal (and other material) migration, and other mechanisms).

BRIEF DESCRIPTION OF THE DRAWINGS

The following description and accompanying drawings are used to illustrate embodiments of the invention. In the drawings.

DETAILED DESCRIPTION

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Bracketed text and blocks with dashed borders (e.g., large dashes, small dashes, dot-dash, dots) are sometimes used herein to illustrate optional operations/components that add additional features to embodiments of the invention. However, such notation should not be taken to mean that these are the only options or optional operations/components, and/or that blocks with solid borders are not optional in certain embodiments of the invention.

Introduction

Memory capacity and performance requirements continue to increase with an increasing number of processor cores and new usage models such as virtualization. In addition, memory power and cost have become a significant component of the overall power and cost, respectively, of electronic systems.

Some embodiments of the invention solve the above challenges by intelligently subdividing the performance requirement and the capacity requirement between memory technologies. The focus of this approach is on providing performance with a relatively small amount of a relatively higher-speed memory such as DRAM while implementing the bulk of the system memory using significantly cheaper and denser non-volatile random access memory (NVRAM). Embodiments of the invention described below define platform configurations that enable hierarchical memory subsystem organizations for the use of NVRAM. The use of NVRAM in the memory hierarchy also enables new usages such as expanded boot space and mass storage implementations, as described in detail below.

Figure 1:
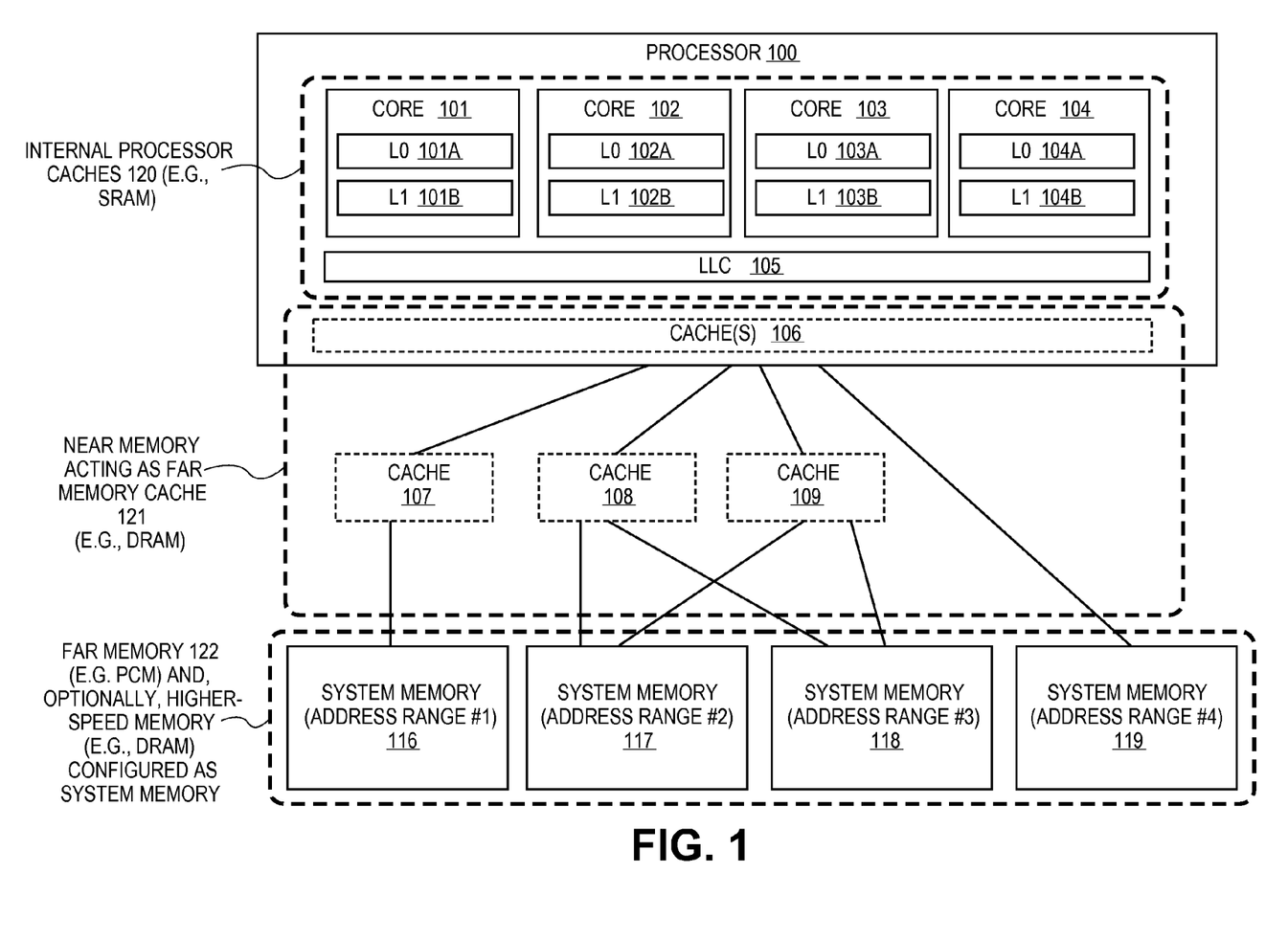
FIG. 1 illustrates a cache and system memory arrangement according to embodiments of the invention.

FIG. 1 illustrates a cache and system memory arrangement according to embodiments of the invention. Specifically, FIG. 1 shows a memory hierarchy including a set of internal processor caches 120, "near memory" acting as a far memory cache 121, which may include both internal cache(s) 106 and external caches 107-109, and "far memory" 122. One particular type of memory which may be used for "far memory" in some embodiments of the invention is non-volatile random access memory ("NVRAM"). As such, an overview of NVRAM is provided below, followed by an overview of far memory and near memory.

A. Non-Volatile Random Access Memory ("NVRAM")

There are many possible technology choices for NVRAM, including PCM, Phase Change Memory and Switch (PCMS) (the latter being a more specific implementation of the former), byte-addressable persistent memory (BPRAM), universal memory, Ge2Sb2Te5, programmable metallization cell (PMC), resistive memory (RRAM), RESET (amorphous) cell, SET (crystalline) cell, PCME, Ovshinsky memory, ferroelectric memory (also known as polymer memory and poly(N-vinylcarbazole)), ferromagnetic memory (also known as Spintronics, SPRAM (spin-transfer torque RAM), STRAM (spin tunneling RAM), magnetoresistive memory, magnetic memory, magnetic random access memory (MRAM)), and Semiconductor-oxide-nitride-oxide-semiconductor (SONOS, also known as dielectric memory).

For use in the memory hierarchy described in this application, NVRAM has the following characteristics:

(1) It maintains its content even if power is removed, similar to FLASH memory used in solid state disks (SSD), and different from SRAM and DRAM which are volatile;
(2) lower power consumption when idle than volatile memories such as SRAM and DRAM;
(3) random access similar to SRAM and DRAM (also known as randomly addressable);
(4) rewritable and erasable at a lower level of granularity (e.g., byte level) than FLASH found in SSDs (which can only be rewritten and erased a "block" at a time—minimally 64 Kbyte in size for NOR FLASH and 16 Kbyte for NAND FLASH);
(5) usable as a system memory and allocated all or a portion of the system memory address space;
(6) capable of being coupled to the processor over a bus using a transactional protocol (a protocol that supports transaction identifiers (IDs) to distinguish different transactions so that those transactions can complete out-of-order) and allowing access at a level of granularity small enough to support operation of the NVRAM as system memory (e.g., cache line size such as 64 or 128 byte). For example, the bus may be a memory bus (e.g., a DDR bus such as DDR3, DDR4, etc.) over which is run a transactional protocol as opposed to the non-transactional protocol that is normally used. As another example, the bus may one over which is normally run a transactional protocol (a native transactional protocol), such as a PCI express (PCIE) bus, desktop management interface (DMI) bus, or any other type of bus utilizing a transactional protocol and a small enough transaction payload size (e.g., cache line size such as 64 or 128 byte); and
(7) one or more of the following:
a) faster write speed than non-volatile memory/storage technologies such as FLASH;
b) very high read speed (faster than FLASH and near or equivalent to DRAM read speeds);
c) directly writable (rather than requiring erasing (over-writing with 1 s) before writing data like FLASH memory used in SSDs); and/or
d) orders of magnitude (e.g., 2 or 3) higher write endurance before failure (more than boot ROM and FLASH used in SSDs).

As mentioned above, in contrast to FLASH memory, which must be rewritten and erased a complete "block" at a time, the level of granularity at which NVRAM is accessed in any given implementation may depend on the particular memory controller and the particular memory bus or other type of bus to which the NVRAM is coupled. For example, in some implementations where NVRAM is used as system memory, the NVRAM may be accessed at the granularity of a cache line (e.g., a 64-byte or 128-Byte cache line), notwithstanding an inherent ability to be accessed at the granularity of a byte, because cache line is the level at which the memory subsystem accesses memory. Thus, when NVRAM is deployed within a memory subsystem, it may be accessed at the same level of granularity as the DRAM (e.g., the "near memory") used in the same memory subsystem. Even so, the level of granularity of access to the NVRAM by the memory controller and memory bus or other type of bus is smaller than that of the block size used by Flash and the access size of the I/O subsystem's controller and bus.

NVRAM may also incorporate wear leveling algorithms to account for the fact that the storage cells at the far memory level begin to wear out after a number of write accesses, especially where a significant number of writes may occur such as in a system memory implementation. Since high cycle count blocks are most likely to wear out in this manner, wear leveling spreads writes across the far memory cells by swapping addresses of high cycle count blocks with low cycle count blocks. Note that most address swapping is typically transparent to application programs because it is handled by hardware, lower-level software (e.g., a low level driver or operating system), or a combination of the two.

B. Far Memory

The far memory 122 of some embodiments of the invention is implemented with NVRAM, but is not necessarily limited to any particular memory technology. Far memory 122 is distinguishable from other instruction and data memory/storage technologies in terms of its characteristics and/or its application in the memory/storage hierarchy. For example, far memory 122 is different from:

static random access memory (SRAM) which may be used for level 0 and level 1 internal processor caches 101*a-b*, 102*a-b*, 103*a-b*, 103*a-b*, and 104*a-b* dedicated to each of the processor cores 101-104, respectively, and lower level cache (LLC) 105 shared by the processor cores;

dynamic random access memory (DRAM) configured as a cache 106 internal to the processor 100 (e.g., on the same die as the processor 100) and/or configured as one or more caches 107-109 external to the processor (e.g., in the same or a different package from the processor 100); and FLASH memory/magnetic disk/optical disc applied as mass storage (not shown); and memory such as FLASH memory or other read only memory (ROM) applied as firmware memory (which can refer to boot ROM, BIOS Flash, and/or TPM Flash).(not shown).

Far memory 122 may be used as instruction and data storage that is directly addressable by a processor 100 and is able to sufficiently keep pace with the processor 100 in contrast to FLASH/magnetic disk/optical disc applied as mass storage. Moreover, as discussed above and described in detail below, far memory 122 may be placed on a memory bus and may communicate directly with a memory controller that, in turn, communicates directly with the processor 100.

Far memory 122 may be combined with other instruction and data storage technologies (e.g., DRAM) to form hybrid memories (also known as Co-locating PCM and DRAM; first level memory and second level memory; FLAM (FLASH and DRAM)). Note that at least some of the above technologies, including PCM/PCMS may be used for mass storage instead of, or in addition to, system memory, and need not be random accessible, byte addressable or directly addressable by the processor when applied in this manner.

For convenience of explanation, the terms NVRAM, PCM, PCMS, and far memory may be used interchangeably in the following discussion. However it should be realized, as discussed above, that different technologies may also be utilized for far memory. Also, that NVRAM is not limited for use as far memory.

An Exemplary System Memory Allocation Scheme

FIG. 1 illustrates how various levels of caches 101-109 are configured with respect to a system physical address (SPA) space 116-119 in embodiments of the invention. As mentioned, this embodiment comprises a processor 100 having one or more cores 101-104, with each core having its own dedicated upper level cache (L0) 101*a*-104*a* and mid-level cache (MLC) (L1) cache 101*b*-104*b*. The processor 100 also includes a shared LLC 105. The operation of these various cache levels are well understood and will not be described in detail here.

The caches 107-109 illustrated in FIG. 1 may be dedicated to a particular system memory address range or a set of non-contiguous address ranges. For example, cache 107 is dedicated to acting as a Memory Side Cache (MSC) for system memory address range #1 116 and caches 108 and 109 are dedicated to acting as MSCs for non-overlapping portions of system memory address ranges #2 117 and #3 118. The latter implementation may be used for systems in which the SPA space used by the processor 100 is interleaved into an address space used by the caches 107-109 (e.g., when configured as MSCs). In some embodiments, this latter address space is referred to as a memory channel address (MCA) space. In one embodiment, the internal caches 101*a*-106 perform caching operations for the entire SPA space.

System memory as used herein is memory which is visible to and/or directly addressable by software executed on the processor 100; while the cache memories 101*a*-109 may operate transparently to the software in the sense that they do not form a directly-addressable portion of the system address space, but the cores may also support execution of instructions to allow software to provide some control (configuration, policies, hints, etc.) to some or all of the cache(s). The subdivision of system memory into regions 116-119 may be performed manually as part of a system configuration process (e.g., by a system designer) and/or may be performed automatically by software.

In one embodiment, the system memory regions 116-119 are implemented using far memory (e.g., PCM) and, in some embodiments, near memory configured as system memory. System memory address range #4 represents an address range which is implemented using a higher speed memory such as DRAM which may be a near memory configured in a system memory mode (as opposed to a caching mode).

Figure 2:
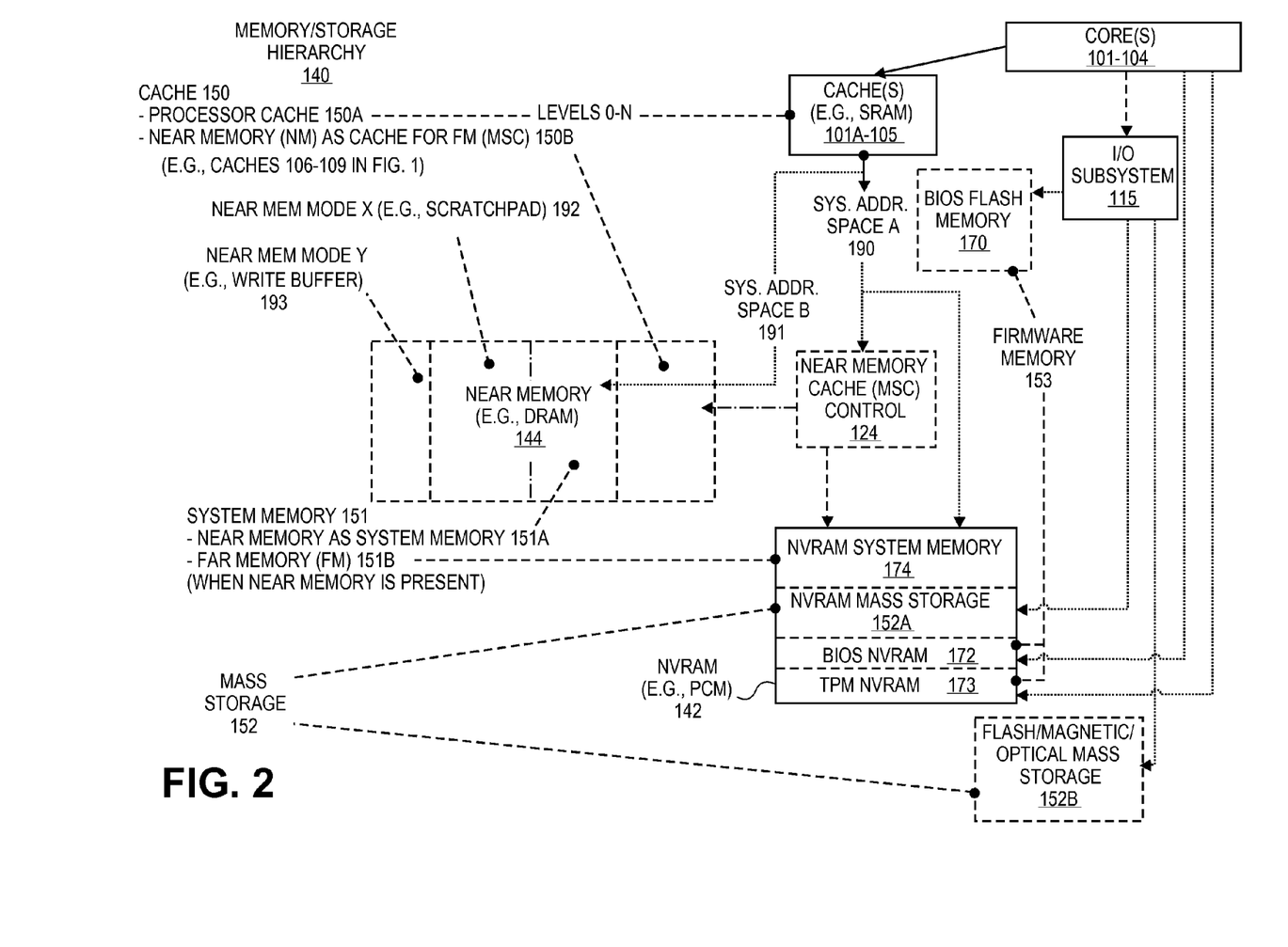
FIG. 2 illustrates a memory and storage hierarchy employed in embodiments of the invention.

FIG. 2 illustrates a memory/storage hierarchy 140 and different configurable modes of operation for near memory 144 and NVRAM according to embodiments of the invention. The memory/storage hierarchy 140 has multiple levels including (1) a cache level 150 which may include processor caches 150A (e.g., caches 101A-105 in FIG. 1) and optionally near memory as cache for far memory 150B (in certain modes of operation), (2) a system memory level 151 which includes far memory 151B (e.g., NVRAM such as PCM) and near memory operating as system memory 151A, (3) a mass storage level 152 which may include a flash/magnetic/optical mass storage 152B and/or NVRAM mass storage 152A (e.g., a portion of the NVRAM 142); and (4) a firmware memory level 153 that may include BIOS flash 170 and/or BIOS NVRAM 172 and optionally trusted platform module (TPM) NVRAM 173.

As indicated, near memory 144 may be implemented to operate in a mode in which it operates as system memory 151A and occupies a portion of the SPA space (sometimes referred to as near memory "direct access" mode); and one or more additional modes of operation such as a scratchpad memory 192 or as a write buffer 193. In some embodiments of the invention, the near memory is partitionable, where each partition may concurrently operate in a different one of the supported modes; and different embodiments may support configuration of the partitions (e.g., sizes, modes) by hardware (e.g., fuses, pins), firmware, and/or software (e.g., through a set of programmable range registers within the MSC controller 124 within which, for example, may be stored different binary codes to identify each mode and partition).

As observed in FIG. 2, system address space B 191 is used to show an implementation when all or a portion of near memory is assigned a portion of the system address space. In this embodiment, system address space B 191 represents the range of the system address space assigned to the near memory 151A and system address space A 190 represents the range of the system address space assigned to NVRAM 174.

When acting in near memory direct access mode, all or portions of the near memory as system memory 151A are directly visible to software and form part of the SPA space. Such memory may be completely under software control. Such a scheme may create a non-uniform memory address (NUMA) memory domain for software where it gets higher performance from near memory 144 relative to NVRAM system memory 174. By way of example, and not limitation, such a usage may be employed for certain high performance computing (HPC) and graphics applications which require very fast access to certain data structures.

FIG. 2 also illustrates that a portion of the NVRAM 142 may be used as firmware memory. For example, the BIOS NVRAM 172 portion may be used to store BIOS images (instead of or in addition to storing the BIOS information in BIOS flash 170). The BIOS NVRAM portion 172 may be a portion of the SPA space and is directly addressable by software executed on the processor cores 101-104, whereas the BIOS flash 170 is addressable through the I/O subsystem 115. As another example, a trusted platform module (TPM) NVRAM 173 portion may be used to protect sensitive system information (e.g., encryption keys).

Thus, as indicated, the NVRAM 142 may be implemented to operate in a variety of different modes, including as far memory 151B (e.g., when near memory 144 is present/operating in direct access mode); NVRAM mass storage 152A; BIOS NVRAM 172; and TPM NVRAM 173.

The choice of system memory and mass storage devices may depend on the type of electronic platforms on which embodiments of the invention are employed. For example, in a personal computer, tablet computer, notebook computer, smartphone, mobile phone, feature phone, personal digital assistant (PDA), portable media player, portable gaming device, gaming console, digital camera, switch, hub, router, set-top box, digital video recorder, or other devices that have relatively small mass storage requirements, the mass storage may be implemented using NVRAM mass storage 152A alone, or using NVRAM mass storage 152A in combination with a flash/magnetic/optical mass storage 152B.

In other electronic platforms that have relatively large mass storage requirements (e.g., large-scale servers), the mass storage may be implemented using magnetic storage (e.g., hard drives) or any combination of magnetic storage, optical storage, holographic storage, mass-storage flash memory, and NVRAM mass storage 152A. In such a case, system hardware and/or software responsible for storage may implement various intelligent persistent storage allocation techniques to allocate blocks of persistent program code and data between the FM 151B/NVRAM storage 152A and a flash/magnetic/optical mass storage 152B in an efficient or otherwise useful manner.

For example, in one embodiment a high powered server is configured with a near memory (e.g., DRAM), a PCMS device, and a magnetic mass storage device for large amounts of persistent storage. In one embodiment, a notebook computer is configured with a near memory and a PCMS device which performs the role of both a far memory and a mass storage device. One embodiment of a home or office desktop computer is configured similarly to a notebook computer, but may also include one or more magnetic storage devices to provide large amounts of persistent storage capabilities.

One embodiment of a tablet computer or cellular telephony device is configured with PCMS memory but potentially no near memory and no additional mass storage (for cost/power savings). However, the tablet/telephone may be configured with a removable mass storage device such as a flash or PCMS memory stick.

Various other types of devices may be configured as described above. For example, portable media players and/or personal digital assistants (PDAs) may be configured in a manner similar to tablets/telephones described above, gaming consoles may be configured in a similar manner to desktops or laptops. Other devices which may be similarly configured include digital cameras, routers, set-top boxes, digital video recorders, televisions, and automobiles.

An Exemplary System Memory Allocation Scheme

Figure 3:
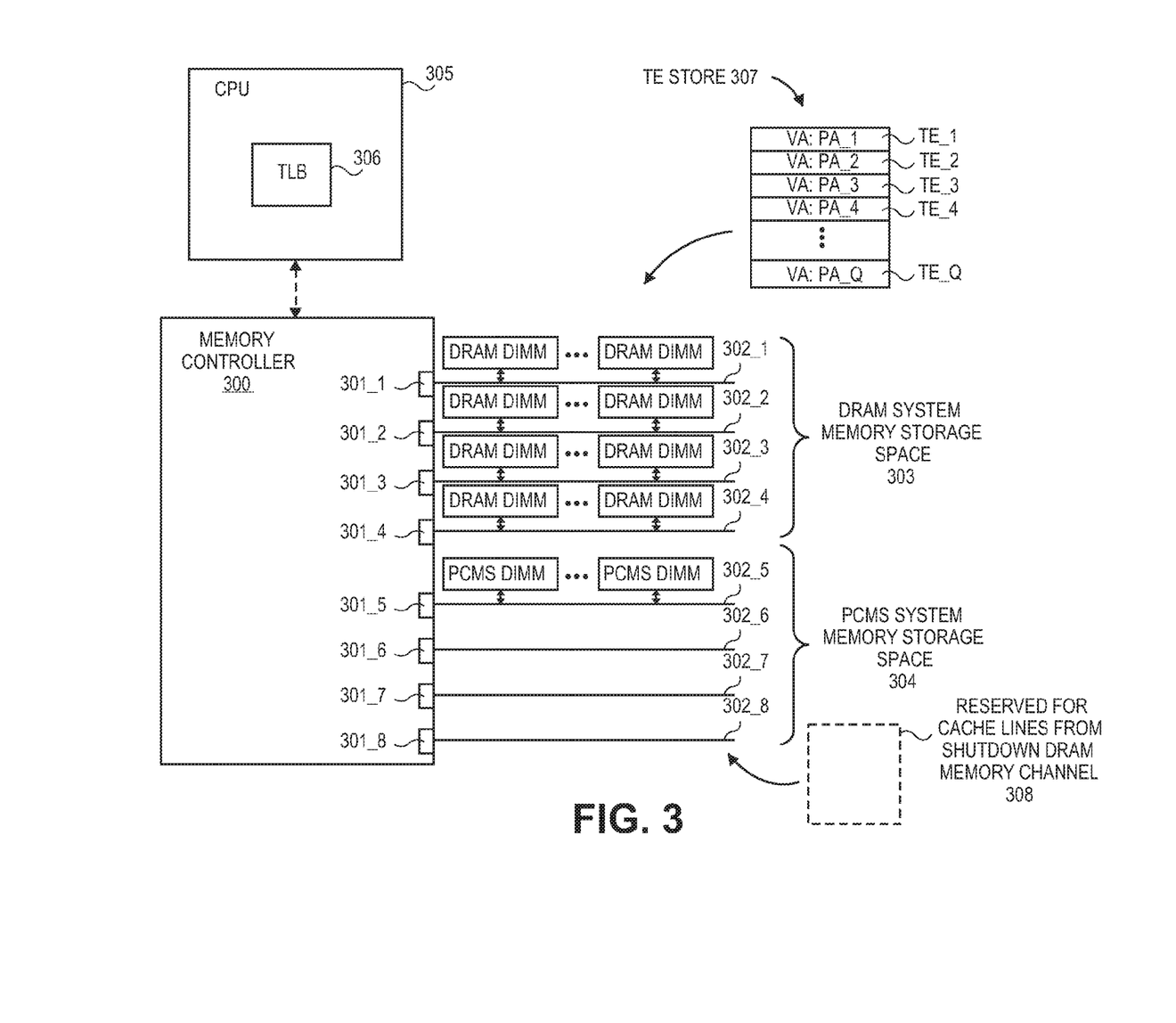
FIG. 3 shows a memory computing system having a DRAM section of system memory and a PCMS section of system memory.
Figure 4:
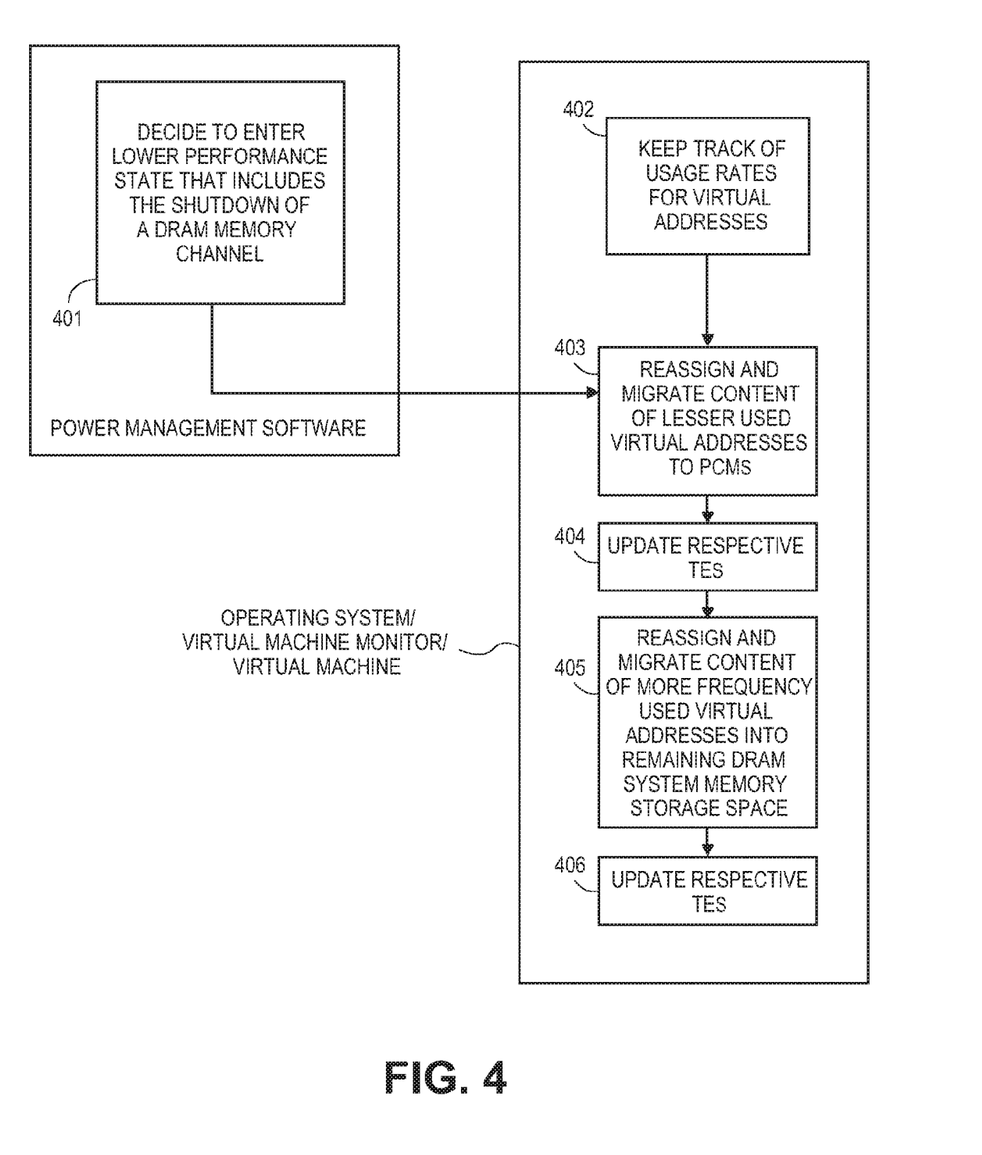
FIG. 4 shows a methodology for shutting down a memory channel.
Figure 5:
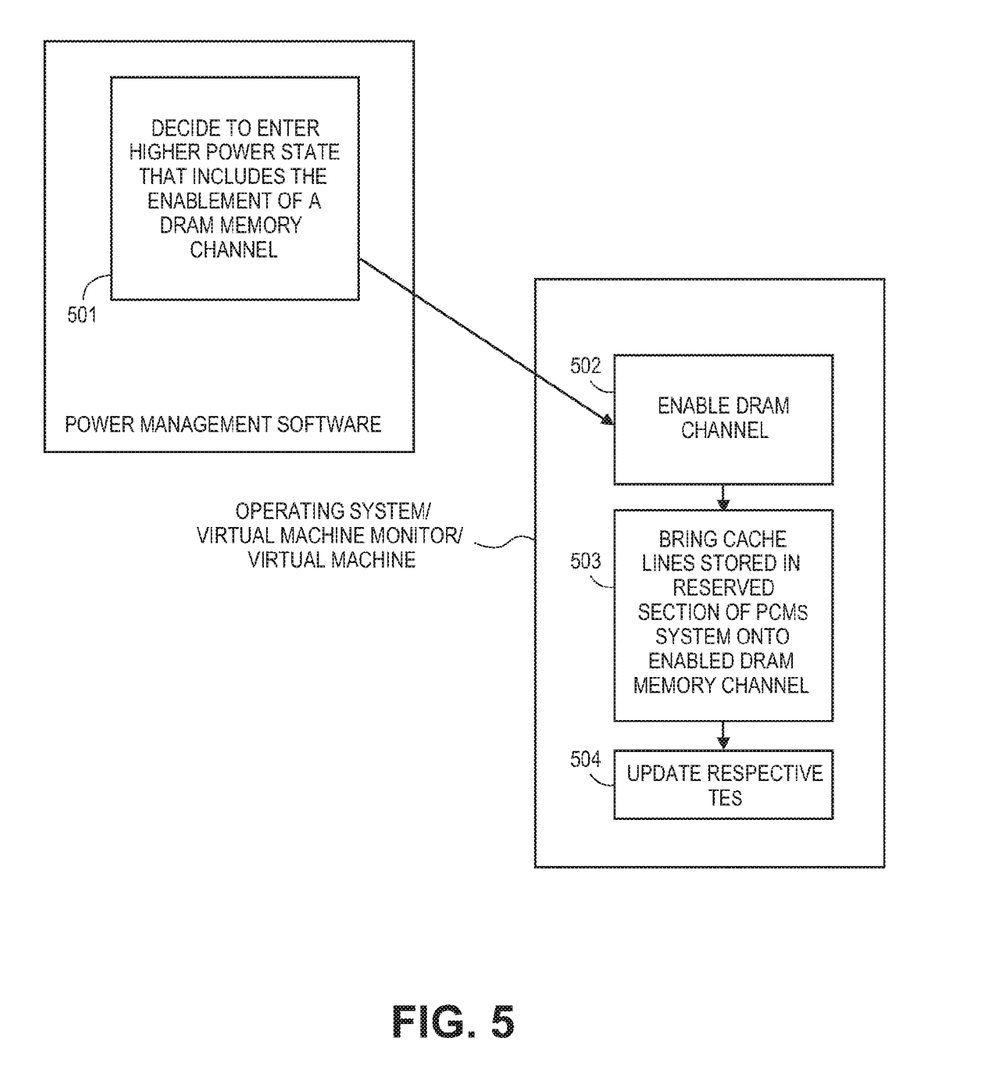
FIG. 5 shows a methodology for re-activating a memory channel.

FIG. 3 shows a memory controller 300 of a computing system having respective interfaces 301_1 to 301_8 to a plurality of memory channels (e.g., DDR channels) 302_1 to 302_8 where each channel is capable of supporting one or more DIMM cards (that is, one or more DIMM cards can be plugged into the channel), and, FIGS. 4 and 5 show methods for controlling the power consumption of a computing system by disabling/enabling a memory channel and its corresponding DIMM cards. For simplicity eight memory channels are shown but those of ordinary skill will understand that the teachings herein can be applied to systems having differing numbers of memory channels.

According to the method of FIG. 4, for example, a decision may be made (e.g., by intelligent power management software such as ACPI) to enter a computer system into a lower performance state by disabling a memory channel that is presently operative. Contra-wise, according to the method of FIG. 5, a decision may be made to enter the computer system into a higher performance state by enabling a memory channel that is presently inoperative.

Recall from FIG. 1 that some computing system embodiments having DRAM and NVRAM system memory components may reserve a first portion of system memory addresses for DRAM, and, a second portion of system memory addresses for NVRAM. That is, in the "near memory acting as system memory approach", addressable system memory can include both DRAM (see, e.g., FIG. 2, near memory as system memory 151A) and PCMS (see, e.g., FIG. 2 far memory 151B implemented as NVRAM system memory 174).

According to one embodiment, referring back to FIG. 3, each of the memory channels 302_1 to 302_8 is allotted a unique portion or segment of the computer's system memory addresses consistent with the storage space available on the memory channel. The storage space available on a memory channel, in turn, is a function of the number of DIMM cards plugged into the memory channel, and, the storage density of the memory devices on the DIMM cards.

According to a further embodiment, a first portion 303 of the memory channels (and therefore a corresponding first portion/segment of the system memory address space) is reserved for DRAM DIMMs, and, a second portion 304 of the memory channels (and therefore a corresponding, remaining second portion/segment of the system memory address space) is reserved for PCMS DIMMs.

According to this particular embodiment, the DRAM storage space 303 does not act as a cache for the PCMS storage space 304. Rather, the system memory space is configured to store "access time critical" information (such as program code instructions, or, at least, frequently utilized program code instructions) in the DRAM storage space 303, and, "not, or less, access time critical" information (such as data, or, at least, infrequently accessed data) in the PCMS storage space 304.

Thus, the operating system and/or virtual machine monitor running on the computer's CPU allocate the system memory address space consistent with this scheme. For example, frequently used program code instructions (at least) are given address space that corresponds to those memory channels having DRAM DIMMs, and, infrequently used data items (at least) are given address space that corresponds to those memory channels having PCMS DIMMs. In various embodiments, the content stored at each address, whether DRAM or PCMS, is a fixed length data word (e.g., a 64 bit data word or a 128 bit data word) referred to as a "cache line". For convenience, the terms "content" or "cache line" will be used interchangeably in the following discussion to refer to the information stored at a system memory address.

Referring to the methodology of FIG. 4, when applied to the computer system described just above, the disablement of a memory channel to enter a lower performance state includes disabling the memory channel's DIMM cards and their corresponding memory devices, and, the enabling of a memory channel to enter a higher performance state includes enabling the memory channel's DIMM cards and their corresponding memory devices.

Particularly effective scaling of power consumption and performance can be achieved when channels having DRAM DIMM cards are chosen to be enabled/disabled. As DRAM devices are faster and consume more power than PCMS devices, dropping to a lower performance state by shutting down a DRAM memory channel should significantly lower a computing system's performance and power consumption Likewise, rising to a higher performance state by enabling a DRAM memory channel should significantly increase the computer system's performance and power consumption.

Memory management is a matter of concern, however. Specifically, when a DRAM memory channel is disabled or enabled, the system memory address space should be effectively reconfigured to account for the change in available DRAM memory space. This includes "moving" the content of the DRAM channel to be shutdown to other system memory location. According to the methodology of FIG. 4, the operating system and/or a virtual machine monitor and/or virtual machine and/or power management component of any of these (hereinafter, referred to as "system software") keeps track of the usage 402 of virtual addresses that are allocated to DRAM to build an understanding of which virtual addresses are being accessed more frequently and/or which virtual addresses are being accessed less frequently.

As is known the art, system software is typically designed to refer to virtual addresses and the underlying hardware is responsible for translating the virtual addresses into corresponding physical addresses of the system memory resident in the system.

When a decision is made to disable a DRAM memory channel, the system software effectively reconfigures the DRAM address space such that more frequently used virtual addresses remain assigned to DRAM address space, and, a group of lesser used DRAM virtual addresses, approximately or identically equal in number to the physical addresses kept by the DRAM memory channel that is to be shut down, are re-assigned to PCMS address space. The resulting reassignment of underlying physical addresses (including migration of content of frequently used addresses in the DRAM channel to be shut down to a DRAM channel that is to remain active, and, migration of content of lesser used DRAM addresses to PCMS address space) necessarily affects the virtual address to physical address translations referred to just above.

Typically, a translation lookaside buffer (TLB) 305 resident in the central processing unit (CPU) or "processor" 306 acts as a cache of virtual address to physical address translations. A TLB is well understood in the art, but a brief overview of its role and function is worthy of mention. A TLB contains a number of translation entries (TEs), each TE identifying a unique physical address for a specific virtual address, also referred to as an address translation. Typically the translation itself is specified to the granularity of memory page. Therefore a virtual address's TE contains the psychical address of its corresponding memory page in the computing system's system memory.

The TLB is designed to contain the set of TEs (up to the size of the TLB) whose associated virtual addresses were most recently called out by the executing program code. As each of the virtual addresses called out by executing program code identify either a specific program code instruction or a specific item of data to be operated upon, various processor architectures may include both an instruction TLB and a data TLB.

In the case of an instruction TLB, during program code execution, a next virtual address for a next instruction is fetched and a lookup is performed in the instruction TLB for a match between the virtual address of the instruction and the virtual addresses within the instruction TLB TEs. In a common approach, lower ordered bits of the virtual address are not used in the lookup so that the lookup parameter (i.e., higher ordered bits of the virtual address) essentially corresponds to the address of a virtual memory page. If a match is found, the physical address found in the TE having the matching virtual address identifies a specific memory page in system memory where the desired instruction can be found.

If a matching virtual address is not found in the instruction TLB (an instruction TLB "miss"), then, tablewalk hardware of the processor fetches the appropriate TE from system memory. The physical address within the TE fetched from system memory identifies the memory page in system memory where the next instruction can be found. A copy of the TE fetched from system memory is also typically loaded in the instruction TLB and a least recently used TE is evicted from the instruction TLB. The original TE fetched from system memory remains in system memory.

The data TLB, including system operation in response to a data TLB miss operates much the same as described above except that the virtual address is for a desired data item and the physical address found in the desired TE identifies a page in system memory where the desired data is found.

Importantly, note that the set of TEs containing all virtual address to physical address translations (for both instruction and data) for the set of virtual addresses that an operational program (e.g., an application and/or a virtual machine) may call out over the course of its operation are located in a special store 307, referred to as a "TE store", that is kept in system memory. In an embodiment, the TE store 307 for an operational program is loaded into system memory as part of the loading of the operational program into memory for execution. When multiple programs are concurrently operating on the computer, in an embodiment, a TE store is kept in system memory for each operational program. In a further embodiment, all TE stores, and therefore all TEs, are kept in a special segment of DRAM system memory on an DRAM channel that cannot be disabled.

When system memory space is reconfigured to account for the shutdown (or enablement) of a memory channel as part of a power management decision to change the computer's performance state, the aforementioned movement of the DRAM memory content creates a need, for each cache line that is to be migrated and therefore have a "new" physical address, to update its corresponding TE to reflect its new physical address location 404. The specific TEs that should be updated include: i) TEs of more frequently used DRAM addresses whose content is to be migrated from a DRAM channel being shutdown to a DRAM channel that is not being shutdown; and, ii) TEs of less frequently used DRAM addresses whose corresponding content is to be migrated to PCMS address space.

In an unlikely situation, all of the least frequently used DRAM addresses happen to be on the particular DRAM channel that is to be shutdown. In this case, no DRAM addresses on any other DRAM channel are affected by the channel shutdown (i.e., all the content of the DRAM channel being shut down is migrated to PCMS storage). As such, in this unlikely scenario, only the TEs of the DRAM addresses of the channel being shutdown are modified to reflect a new physical address in PCMS memory.

In a more likely scenario, some of the more frequently used DRAM addresses reside on the memory channel being shutdown, and, some of the less frequently used DRAM addresses reside on the remaining channel(s) that are not being shutdown. In an embodiment, the number of least frequently used DRAM addresses identified for migration to PCMS storage is the same (or approximately the same as) the number of addresses that are supported by the DRAM channel to be shut down. This essentially corresponds to equating the number of DRAM addresses that are flagged for migration to PCMS storage space with the number of DRAM addresses that are "lost" by way of the shutdown of the DRAM channel.

With this approach, the number of frequently used DRAM addresses on the DRAM channel being shutdown whose content needs to be migrated to a new DRAM address (specifically, an address on another DRAM channel that is to remain active) should be the same as the number of least frequently used DRAM addresses on those DRAM channel(s) that are to remain active whose content needs to be migrated to a new PCMS address (i.e., an address in PCMS storage). As such, the content of the former can replace the content of the later in the DRAM space that is to remain active after the channel shutdown. That is, the content of frequently used DRAM addresses on the DRAM channel being shutdown can be written into the DRAM addresses of the least frequently used DRAM addresses of the DRAM channel(s) that are not being shutdown.

As such, according to the approach of FIG. 4, the cache lines of least frequently used DRAM addresses, both those on the DRAM channel to be shutdown and those on another DRAM channel, are read from DRAM and written into PCMS storage space 403. The physical address information for their respective memory pages as kept in their corresponding TEs (in their respective TE stores—because multiple software applications may be affected by the channel shutdown) in system memory are modified to reflect their new respective PCMS addresses 404.

Then, the "just vacated" DRAM addresses on the active DRAM channels are re-populated with the cache lines of the frequently used DRAM addresses on the DRAM channel that is to be shutdown 405.

As such, each vacated least frequently used DRAM address on a remaining active channel is rewritten with a cache line from another more frequently used DRAM address on the channel that is to be shutdown. The TE record in system memory for each of the memory pages of the more frequently used DRAM addresses being migrated from the channel that is to be shutdown to the remaining active DRAM channel(s) is modified to reflect its new physical address location 406. Notably, each new physical address corresponds to an address that was previously identified as being least frequently used.

In an embodiment, as part of the original system bring-up (e.g., well before the decision to shutdown the DRAM channel is made), a section of PCMS storage 308 is reserved for receiving "a DRAM channel's worth" of cache lines in case of a DRAM channel shutdown. Here, no active information is stored in the PCMS section unless and until a DRAM channel is shutdown, at which point, a number of cache lines equivalent in total data size to the storage capacity of the DRAM channel being shutdown is loaded into the section 308 from the DRAM storage space. Upon update of their corresponding TEs in their respective TE stores, these cache lines are subsequently accessed from the PCMS section to support program operation. Multiple such sections of PCMS system memory may be pre-reserved as described above to support a system that can operate while multiple DRAM channels are shutdown 407.

As part of the system memory reconfiguration process described above, any copy of a modified TE resident in a TLB is invalidated. Note that system operation may be suspended over the course of the system memory configuration as well.

After a DRAM channel is shutdown, referring to FIG. 5, a subsequent decision may be made by system software to enter a higher performance state 502 which includes the activation of a presently inactive DRAM channel 502. In this case, cache lines resident in the aforementioned section 308 of PCMS system memory 304 reserved for storage of content migrated down from DRAM are "re-migrated back up" to the DRAM channel being activated 503. The physical address component of the TEs for the corresponding memory pages of all such cache lines are modified in the TE store 307 to reflect their new storage in the newly activated DRAM channel 504. Again, system operation may be suspended to implement the DRAM channel activation, cache line migration, TE modification and invalidation of any copies of modified TEs resident in a TLB.

Figure 6:
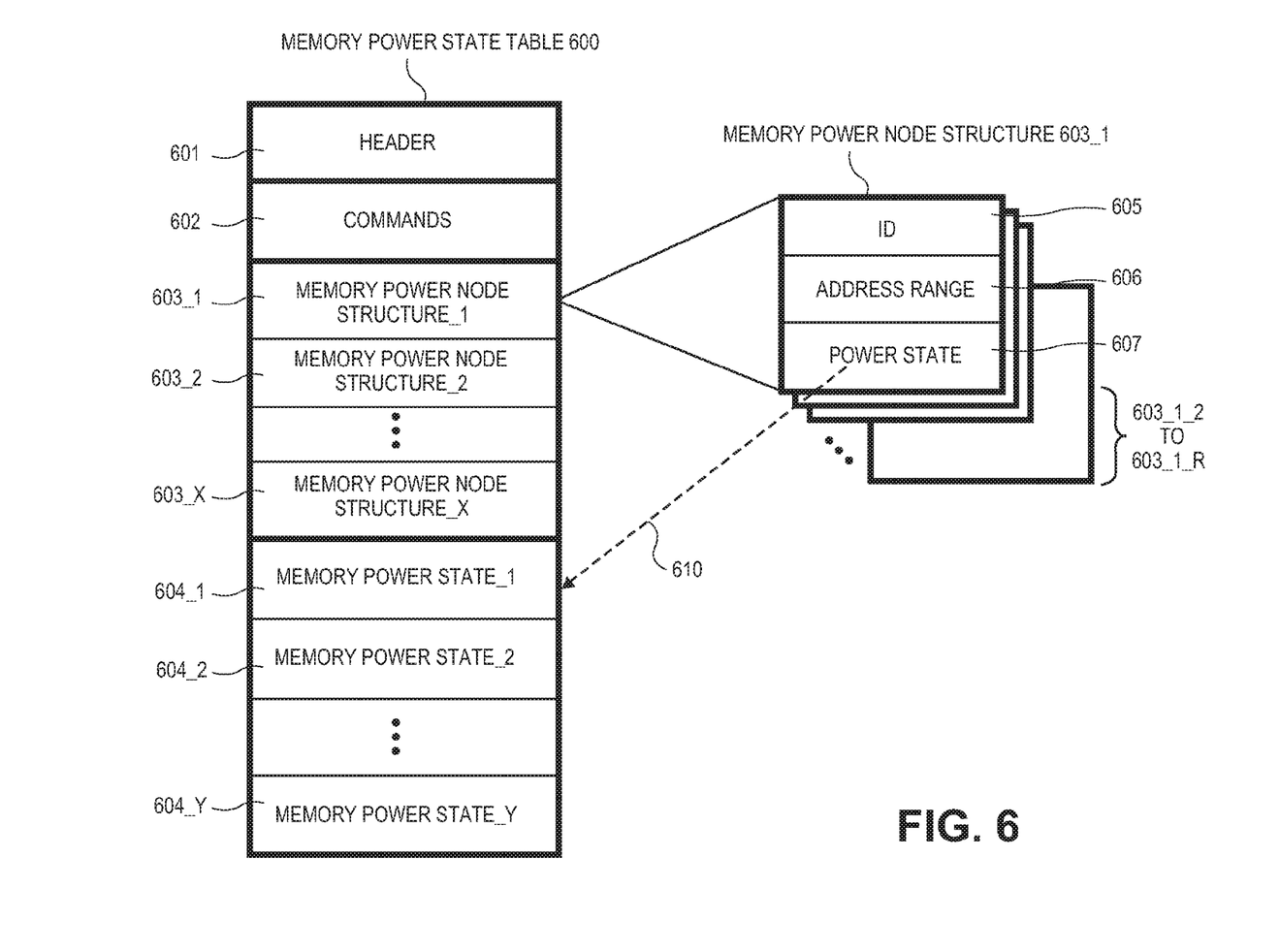
FIG. 6 shows memory power state table for use by a power management system.

FIG. 6 shows a software table structure hierarchy that may be utilized, for example, by intelligent power management software (such as ACPI) to support the ability of a computer system to enable/disable a memory channel as described above. As observed in FIG. 6, the memory power state table 600 hierarchy includes a header 601, a set of commands 602, definitions of one or more power nodes 603_1 to 603_X, and the characteristics of the different power states 604_1 to 604_Y supported by the region of system memory represented by the memory power state table 600.

A single instance of a memory power state table may instantiated, for example, for any of: an entire system memory, a technology specific region of a system memory (such as a first table instantiated for a DRAM section of system memory and a second table instantiated for a PCMS section of system memory), etc. The header information 601 includes information that is specific to the portion of system memory that the memory power state is instantiated on behalf of. In an embodiment, the header information 601 includes: i) a signature for the table; ii) the length of the entire table including all of its components 602, 603, 604; iii) the version number of the table's structure; iv) a checksum for the table; v) an OEM identifier; vi) an ID of a vendor of a utility that created the table; and, vii) an ID of a revision of the utility that created the table.

The set of commands include basic commands for reading/writing information from/to the power state table and its various components.

The memory power state table identifies the number (X) of power node structures 603 listed in the table and includes, or at least provides references to, the power node structures themselves 603_1 through 603_X. In an embodiment, a separate power node structure instance is created for each memory channel in the portion of memory that the table 600 represents that is capable of supporting multiple power states—any one of which may be programmably entered. For example, referring briefly to FIG. 3, if the memory power state table 600 represents the DRAM portion 303 of a system memory having both DRAM 303 and PCMS 304 sections, a separate power node structure can be instantiated for each DRAM memory channel 302_1 to 302_4.

As observed in FIG. 6, each power node structure, such as power node structure 603_1, includes: i) an identifier of the power node structure 605; ii) the address range 606 of the system memory address space that the power node structure represents; and, iii) the power state 607 that the specific section of system memory represented by the power node structure 606 is currently in. Note that the current memory power state 607 corresponds to one of the power states from the set of memory power states 604_1 to 604_Y defined by the power state table 600 as a whole.

In an embodiment where the power node structure 603_1 represents a DRAM channel, the address range 606 of the power node structure corresponds to a range of virtual system memory addresses whose translation into physical address space corresponds to physical addresses supported by the channel. The aforementioned shutdown and re-enablement of a memory channel, however, can "scramble" a contiguous virtual address range across multiple memory channels. Said another way, at least after a channel shutdown sequence, a single memory channel may support multiple non-contiguous sections of virtual address space.

This fragmentation of virtual address space over its corresponding physical storage resources may be compounded each time a memory channel shutdown sequence is initiated. As such, in an embodiment, multiple additional power node structures 603_1_2 to 603_1_R may be instantiated for the same memory channel, where each such power node structure instance corresponds to a different range of virtual address space that is effectively stored in the channel. The various power node structure instances can be effectively "tied" together in a manner that is representative of their corresponding virtual address ranges being stored on the same memory channel by entering the same power node structure identifier element 605 in each of them. Any action taken to this particular identifier will naturally invoke all of the power node structures 603_1 and 603_1_2 to 603_1_R having the identifier.

During a channel shutdown or channel re-enablement transition, the power node structure instance(s) of a particular memory channel should be modified to reflect the "new" virtual addresses that the channel supports the storage of. This may involve any of: the addition of new or the deletion of existing power node structure instances instantiated for the memory channel, and/or, modification of the virtual address ranges 606 specified in existing power node structure instances instantiated for the memory channel. As such, according to various embodiments, when a memory channel is shutdown or re-activated, not only are TE entries in a TE store in system memory modified for affected virtual address to physical address translations, but also, address range 606 elements of power node structures used by power management software, as well as the number of such structures themselves, may also be modified.

When a DRAM memory channel is shutdown as described at length above the current power state 607 of the memory channel's power node structure instance(s) corresponds to a low power state in which the memory channel is shutdown and is not actively being used. In this power state, the application of clock, strobing and/or refresh signals to the DIMM cards on the memory channel may be suspended. The power supply voltages applied to the DIMM cards on the channel may also be reduced as part of the low power state's set of characteristics.

If the memory channel is reactivated after being shutdown, the current power state setting 607 of the memory channel's power node structure instance(s) will change to another power state that corresponds to the memory channel being active. In this case, any disabled signals or supply voltages are re-applied.

For the above power state transitions, driver software embedded in an operating system that is associated with a memory channel can oversee the disabling of the various signals and supply voltages when entering a low power state as well as the enabling of various signals and supply voltages when entering a higher power state.

In an embodiment, the current memory power state setting 607 includes a pointer 610 that points to the specific power state amongst the set of power states 604_1 to 604_Y supported by the table 600 that the power node structure 603_1 is currently in. In an embodiment, each power state definition amongst the power state definitions 604_1 to 604_Y defines the average power consumed (and/or max—min power consumption rates) when a system memory component is in that power state. In a further embodiment, each power state definition also includes a definition of the amount of time that is expended when transitioning into or out of the power state (e.g., an exit latency).

Note that although the above discussion has been centered primarily on the shutdown of an entire, single channel, the teachings above could be applied to both wider and finer granularities.

Specifically, the teachings above could be applied to a sequence in which more than one channel is shutdown as part of a same power state change sequence (e.g., in cases where interleaving exists across the memory channels), or, a sequence in which less than an entire memory channel is shut down (such as the shut down of just one DRAM chip).

Figure 7:
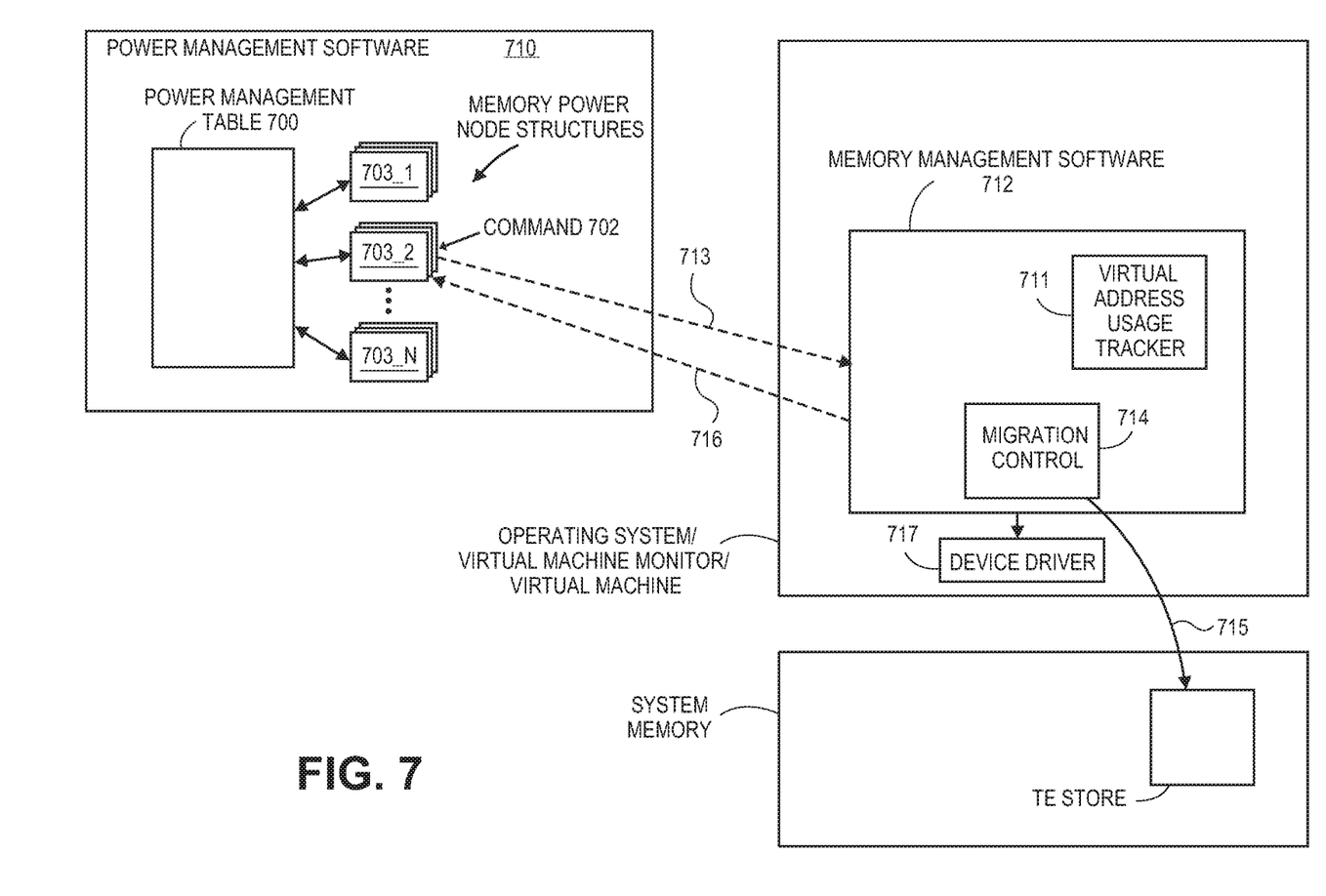
FIG. 7 shows components for implementing shutdown/reactivation of a memory channel.

FIG. 7 shows a software architecture that includes power management software 710, a power management table 700 as discussed above, and, a component 711 of memory management software 712 that keeps track of the usage rates for a software program's virtual addresses and updates the TE information of migrating cache lines.

The power management software function 710 (such as ACPI) decides that a lower system power state is necessary. With prior awareness, through the availability of the power management table 700, that the system memory is organized into various power nodes 703_1 to 703_N that support different power states, the power management software 701 issues a command 702 identifying one such power node 703_2 and a new lower power state that it should enter.

Here, each of the power nodes 703_1-703_N correspond to different DRAM (and possibly PCMS) memory channels resident in the computing system each having multiple DIMM cards plugged into them. In this example, power node 703_2 corresponds to a DRAM memory channel. Memory management software 712 for the underlying memory channels of the computer system is invoked 713 in response to the command 712 and recognizes the specific DRAM memory channel that is to be shutdown.

The memory management software 712 includes a tracking component 711 that tracks which DRAM allocated virtual addresses are more frequently used and which DRAM allocated virtual addresses are less frequently used. Subtracting the loss of DRAM storage capacity with the shutdown of the DRAM memory channel, a new smaller DRAM capacity for the system is understood. The most frequently used DRAM virtual addresses (and/or other "time access critical virtual addresses are flagged) consistent with this capacity are identified for keeping in DRAM storage. The remainder correspond to a collection of lesser used DRAM virtual addresses, the size of whose corresponding content is equivalent to the capacity of the memory channel to be shutdown.

A migration control component 714 controls the appropriate cache line migration as discussed above. Here, again, the migration includes reading the cache lines associated with lesser used virtual addresses from DRAM (those on the memory channel to be shut down and those on another DRAM memory channel) and writing them into reserved space in PCMS memory. The cache lines associated with frequently used virtual addresses located on the memory channel to be shutdown are migrated into locations of the remaining active memory channels that were effectively vacated by the migration into PCMS memory space. The TEs in the TE store of virtual addresses having a new physical address owing to migration are updated 715 and any affected TEs in a TLB are invalidated.

The address range information of the power nodes in the power table 700 that represent the remaining active DRAM memory channels are then updated 716 to reflect their new virtual address ranges. This may include the creation or deletion of power node instances that are identified as being part of the same power node.

The power channel is then shutdown, for example, by device driver software 717 for the memory channel that can stop or slow down various clock/strobe signals on the channel (and possibly further reduce a supply voltage on the memory channel).

The power channel can be reactivated according to a similar flow but where the migration control component 714 migrates the cache lines previously stored in PCMS onto the re-activated memory channel.

Although the above methodologies have been presented as being performed largely if not entirely in software, any of the various steps discussed above may be performed in hardware or with a combination of hardware and software.

What is claimed is:

1. A method, comprising:
performing the following in response to a desire to enter into a lower performance state:
migrating cache lines stored on a dynamic random access memory (DRAM) memory channel into other DRAM memory channels and active non volatile system memory, said active non volatile system memory being accessible at cache line granularity and from which software program code is able to directly execute out of, where, those of said cache lines associated with more frequently used virtual addresses are migrated into said other DRAM memory channels, and, those of said cache lines associated with less frequently used virtual addresses are migrated into said active non volatile system memory; and,
shutting down said DRAM memory channel.

2. The method of claim 1 wherein said cache lines migrated into active non volatile system memory are migrated into storage space previously reserved in said active non volatile system memory for cache lines that migrate from DRAM storage in response to a DRAM memory channel shutdown operation.

3. The method of claim 2 wherein said method further comprises performing the following in response to a desire to enter into a higher performance state:
re-activating said DRAM memory channel;
migrating those of said cache lines migrated into active non volatile system memory onto said DRAM memory channel.

4. The method of claim 1 further comprising updating virtual to physical address translations for said cache lines.

5. The method of claim 4 wherein said virtual to physical address translations are stored in storage space of said other DRAM memory channels.

6. The method of claim 5 further comprising invalidating any virtual to physical address translations for said cache lines found in a translation look aside buffer.

7. A method, comprising:
tracking usage of virtual addresses of a software program; and,
performing the following in response to a desire to enter into a lower performance state:
reading cache lines from dynamic random access memory (DRAM) memory channels associated with lesser used virtual addresses of said software program;
writing said cache lines into active non volatile system memory, said active non volatile system memory being accessible at cache line granularity and from which said software program is able to directly execute out of;
writing cache lines associated with more frequently used virtual addresses of one of said DRAM memory channels into locations of the other remaining one or more DRAM channels, said locations previously storing at least some of said cache lines written into active non volatile system memory; and, shutting down said one DRAM memory channel.

8. The method of claim 7 wherein said cache lines written into active non volatile system memory are written into storage space of said active non volatile system memory previously reserved for the storage of cache lines migrating from DRAM storage space.

9. The method of claim 8 further comprising performing the following in response to a desire to enter into a higher performance state:

re-activating said one DRAM memory channel;

migrating said cache lines written into active non volatile system memory onto said DRAM memory channel.

10. The method of claim 7 further comprising updating virtual to physical address translations for said cache lines associated with lesser used virtual addresses and said cache lines associated with more frequently used virtual addresses.

11. The method of claim 10 further comprising invalidating any virtual to physical address translations found in a translation look aside buffer for said cache lines associated with lesser used virtual addresses and said cache lines associated with more frequently used virtual addresses.

12. A machine readable storage medium, and not transitory signal energy, containing program code that when processed by a central processing unit of a computing system causes a method to be performed, said method comprising:

performing the following in response to a desire to enter into a lower performance state:

migrating cache lines stored on a dynamic random access memory (DRAM) memory channel into other DRAM memory channels and active non volatile system memory, said active non volatile system memory being accessible at cache line granularity and from which software program code is able to directly execute out of, where, those of said cache lines associated with more frequently used virtual addresses are migrated into said other DRAM memory channels, and, those of said cache lines associated with less frequently used virtual addresses are migrated into said active non volatile system memory; and, shutting down said DRAM memory channel.

13. The machine readable storage medium of claim 12 wherein said cache lines migrated into non volatile system memory are migrated into storage space previously reserved in said active non volatile system memory for cache lines that migrate from DRAM storage in response to a DRAM memory channel shutdown operation.

14. The machine readable storage medium of claim 13 wherein said method further comprises performing the following in response to a desire to enter into a higher performance state:

re-activating said DRAM memory channel;

migrating those of said cache lines migrated into active non volatile system memory onto said DRAM memory channel.

15. The machine readable storage medium of claim 12 wherein said method further comprises updating virtual to physical address translations for said cache lines.

16. The machine readable storage medium of claim 15 wherein said virtual to physical address translations are stored in storage space of said other DRAM memory channels.

17. The machine readable storage medium of claim 16 further comprising invalidating any virtual to physical address translations for said cache lines found in a translation look aside buffer.

18. A computer system, comprising:

a plurality of processing cores;

a system memory comprising a plurality of DRAM channels and non volatile memory devices, the non volatile memory devices being accessible at cache line granularity and from which software program code is able to directly execute out of;

a memory controller couple between the plurality of processing cores and the system memory;

a machine readable storage medium containing program code that when processed by at least one of the processing cores causes a method to be performed upon the system memory, said method comprising:

performing the following in response to a desire to enter into a lower performance state:

migrating cache lines stored on a first of the DRAM memory channels into other ones of the DRAM memory channels and one or more of the non volatile memory devices, where, those of said cache lines associated with more frequently used virtual addresses are migrated into said other DRAM memory channels, and, those of said cache lines associated with less frequently used virtual addresses are migrated into said active non volatile system memory; and, shutting down said first of the DRAM memory channels.

* * * * *